Figure 1:
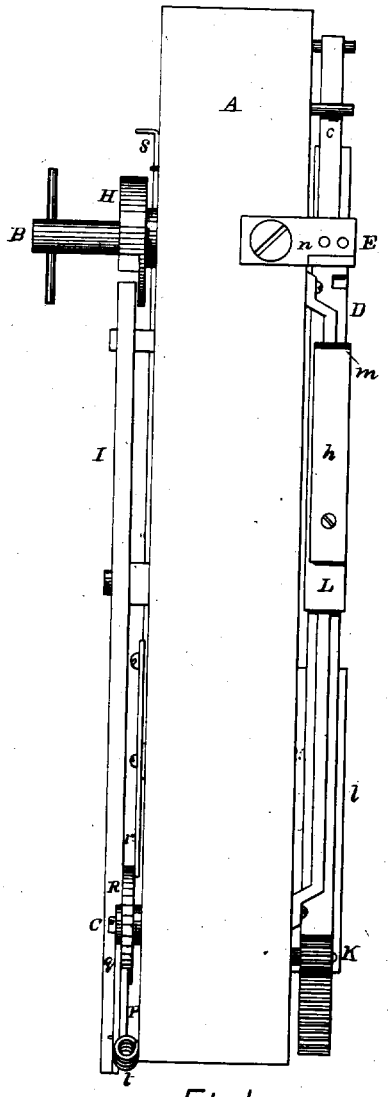
Figure 2:
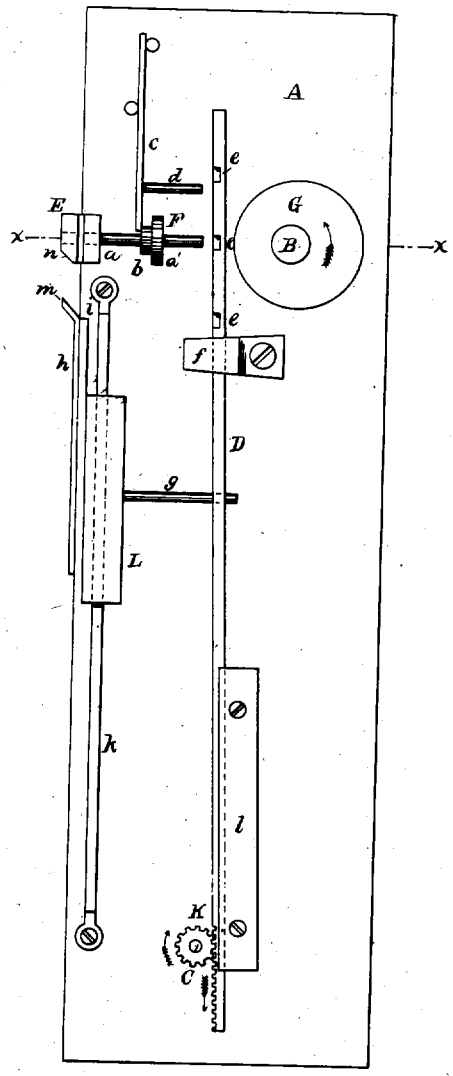
Figure 3:
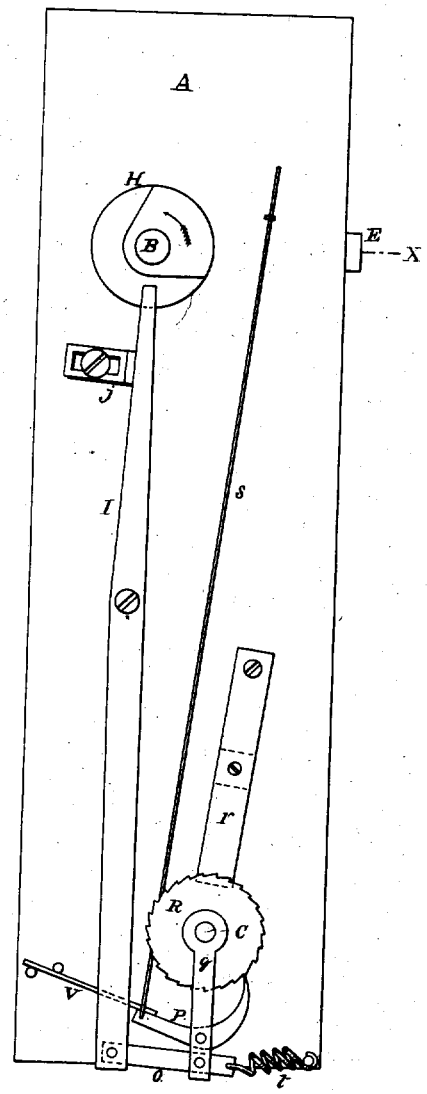
Figure 5:
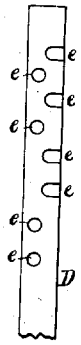
Figure 4:
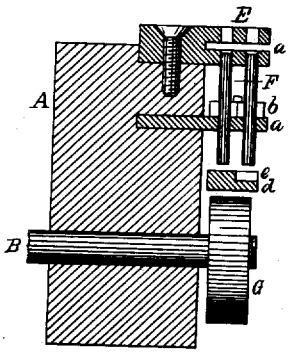

2 Sheets—Sheet 1.

R. T. SMITH.

Paper Perforating Machine.

No. 9,429, Reissued Oct. 19, 1880.

Witnesses.

E. G. Perkins.

E. K. McLennie

Inventor,

Roswell T. Smith,

By Charles B. Tilden

Attorney.

R. T. SMITH.

Paper Perforating Machine.

No. 9,429. Reissued Oct. 19, 1880.

Witnesses:

E. C. Perkins.

O. K. McLarnie

Inventor,

Roswell T. Smith,

By Charles B. Tilden

Attorney.

UNITED STATES PATENT OFFICE.

ROSWELL T. SMITH, OF NASHUA, NEW HAMPSHIRE.

PAPER-PERFORATING MACHINE.

SPECIFICATION forming part of Reissued Letters Patent No. 9,429, dated October 19, 1880.

Original No. 189,144, dated April 3, 1877. Application for reissue filed April 17, 1880.

*To all whom it may concern:*

Be it known that I, ROSWELL T. SMITH, of Nashua, in the county of Hillsborough and State of New Hampshire, have invented a new and useful Improvement in Paper-Perforating Machines, which improvement is fully set forth in the following specification, reference being had to the accompanying drawings, in which—

Figure I is a top view of the device. Fig. II is a vertical view of the right side of Fig. I. Fig. III is a vertical view of the left side of Fig. I. Fig. IV is a section of the same on line *x*, Fig. II. Fig. V is the sliding platform which holds the design to be perforated.

Similar letters of reference indicate corresponding parts in the several figures.

The object of my invention is to perforate designs in card-board, like the ordinary perforated card-board of the market, while the surface not occupied by the design is not perforated.

The operation of the machine will be hereinafter set forth.

The following description of my invention will enable others skilled in the art to understand it.

In the accompanying drawings, A represents the frame which supports the mechanism. This may be of any convenient form desired, having bearings for the shaft at one end, or both, as the size and extent of the machine may require.

B is the shaft through which power and motion is imparted to the machine. C is a shaft supporting and connecting the gear K and ratchet R. D is a platform with a rack on one end, which engages the gear K, and with parts cut away at its other end, so as to form a design such as is desired to be cut in the card-board. F is the punch or punches that perforate the card-board in connection with the die E. G is an eccentric on shaft B, which, when it revolves, lifts the platform D and causes the punches that it strikes to rise and perforate the card-board. H is a cam on the shaft B, which elevates the bar I, and thereby draws back the dog P on the ratchet R. L is a block, which slides on the bar *k*, moving with the platform D, through its connection with it by the part *g*. On the block are the forceps, consisting of two arms or parts, *h* and *i*, one of which—viz., *h*—is a spring, which bears on the rigid part *i*, and thereby clasps and firmly holds the edge of the card-board to be perforated. On the die E is an incline, on which the spring *h* is raised, and the forceps are opened for the reception of the card-board when the platform and block are drawn back. On the punch F is firmly secured the collar *b*, which prevents the punch from falling below its (the collar's) contact with the bracket *a'*, and it also serves as a part on which the presser *c* may act to withdraw the punch from the die and the card-board.

*c* is a spring, acting as a presser to withdraw the punch from the die. The pin *d* projects from *c*, and its function is to raise the spring-presser by contact with the rising platform D, thereby taking the pressure of *c* from the punch F when perforating the card-board.

*f* is a guard, open at top, keeping the platform D in place. *l* is another guard for the same purpose as *f*.

In Fig. III, *j* is a stop, which prevents the bar I from falling lower than is wanted, and by being adjusted higher or lower it regulates, through the ratchet R, gear K, platform D, and block L, the distance the card-board shall move between the acts of perforation.

*q* is a lever fitting loosely on the shaft C. It supports the dog P, which engages the ratchet R. It also supports the connecting-bar *o*, through which bar the lever *q* receives its downward or backward motion, while its upward or forward motion is given by the spring *t*. The dog P is held in connection with the ratchet by the spring V.

*s* is a wire, secured at one end to an extended part of the dog P, and its use is to enable the operator to disconnect the dog and ratchet by pulling the wire, thereby enabling the platform to be drawn back and to allow the forceps on the block L to receive a new card for perforation.

*r* is a brake, by which friction may be put on the ratchet R to keep it from moving back with the dog P.

Having described the various parts of my invention and their functions, I will now proceed to describe its operation. First pull on the wire *s* until the ratchet R is free from the dog P. Then draw the platform back until the spring *h* strikes the incline on the die E and is raised by contact with it. Then pass the card-board between the die E and the upper bracket, *a*, until it projects between the parts of the forceps *h* and *i* so far as to be firmly held by them when *h* is removed from the incline *n*. The machine is now in position for work. Revolve the shaft B, and the platform D is raised by the eccentric G until the punches that strike the elevated parts of the platform perforate the card-board. In doing this the force of the spring *c* is first relieved from the punches by the part *d* striking the platform as soon as or before it reaches the punch. The further revolution of the shaft permits the platform D to return to its place and the punches to be withdrawn from the die and card-board by means of the presser *c*. At the same time and by motion of the shaft B through the action of the cam H and the bar I the dog P is drawn back, and when the bar I is relieved by its progress from connection with the cam H the ratchet R is, through power received from the spring *t*, moved forward until the motion of the ratchet is stopped by the bar I striking the stop-bracket *j*. The platform D is advanced or moved by the gear K, which is rotated by the motion of the ratchet R through its connections, by means of the shaft C, and the card-board is at the same time drawn between the die and punch the desired distance, the platform and card-board moving simultaneously by the connection of the slide-block L with the platform through the part *g*, thus bringing the machine into position for other perforations, when the same motions of the machine by repetition will give any desired number of perforations, the extent and positions of which will correspond to the progress of the design on the platform.

It is obvious that the die-plate E may be extended to any desired length, and the punches multiplied to any desired number, and that, if the platform is extended so as to force all the punches into the dies, the surface of the card-board will be at regular intervals provided with perforations, and also that the platform may be cut away, so as to form any design wished for, raised in relief upon the surface of the platform, or the designs may be cut and secured upon the platform, making it a part of the same, and that the punches only which strike the raised design will be forced through the card-board into the die; and where the platform is cut away the punches are not forced through the card-board and it is left plain, thus enabling the operator, by changing the raised designs on the platform, to make any wished-for pattern.

I would remark that the gear K may be below the platform D, the platform being raised and lowered the same in all its surface; also, that the ratchet may be driven forward instead of drawn back by the action of the cam H and bar I, the dog being driven back by the spring; also, that the presser *c* may perform its functions by means of a weight, or by power imparted from the shaft B by a cam or other device.

I would remark that by "perforations" I do not mean holes broken through the card-board, leaving a rough or broken edge, as card-board so perforated would be useless for embroidering. What I mean is the removing a small portion of the card-board by a clean, sharp cut, which leaves the card-board and the edges of the holes smooth. This can best be done by a punch and die.

In Fig. V of the drawings I have shown the manner of delineating the pattern upon a surface which is forced against the blunt ends of the punches between each feed movement or advance of the pattern and the paper sheet.

It is obvious that those portions of the pattern which are cut away will not strike the punches, while those parts not removed will impinge upon the ends of those punches which happen to register therewith.

Wherever the nature of the design or pattern requires it, certain punches will cut repeated strokes or have successive action. By proper adjustment of the feeding devices those punches which operate in succession may be caused to cut perforations with a greater or less interval between the successive cuts. Thus, by the adjustment of the feed, successive perforations might, should the pattern require it, be made to impinge upon each other or to be separated by a mere filament, at the will of the operator.

The pattern-block which I have shown in Fig. V of the drawings has any required design represented upon its surface in the manner I have already mentioned. It is plain that by leaving the raised portions of said pattern-block of unequal length, as shown in said figure, those punches which register with said raised portions will cut at every stroke. By adjusting the feed of the pattern-block and paper sheet those punches having continued or successive action may be made to cut continuous openings or to leave any suitable interval between the successive perforations.

Having thus described my invention, what I claim, and desire to secure by Letters Patent, is—

1. The combination, in a perforating-machine, of a single row of independent punches, a pattern block or platform having a pattern delineated thereon by a series of raised parts of varied length and arrangement, and automatic step-by-step feeding devices, whereby the paper sheet may, between each stroke, be fed forward, together with the pattern-block, such a distance that all those punches which cut upon successive strokes will cut continuous openings of any length, corresponding to the varied length and arrangement indicated by the pattern-block, substantially as set forth.

2. The combination of a pattern block or platform having a pattern delineated on its surface by a series of alternate elevations and depressions, a single series of independent punches, automatic feeding devices to impart a step-by-step motion to the pattern-block and paper sheet, and a cam to force the pattern-block against the punches between each feed movement, substantially as and for the purpose set forth.

3. The combination, with a series of independent punches, of a pattern block or platform having any suitable pattern delineated or indicated thereon in the manner set forth, a forceps to hold the paper sheet and draw it through between the punches and die, and automatic feeding devices whereby both the pattern platform or block and the griper shall make a forward step-by-step movement between each stroke of the punches, substantially as and for the purpose set forth.

4. The combination of the die, the independent punches, the presser to retract said punches, the pattern block or platform, automatic feeding devices, as described, for giving a step-by-step forward movement to the pattern-block and paper sheet, and a cam for throwing said platform against the punches between each feed movement, substantially as and for the purpose set forth.

In testimony whereof I have hereunto signed my name in the presence of two subscribing witnesses.

ROSWELL T. SMITH.

Witnesses:
EDWARD J. BOOTH,
NETTA WHEELER.